(No Model.)

C. ST. J. CHUBB.
DUST PAN.

No. 445,278. Patented Jan. 27, 1891.

Witnesses
H. C. Newman,
E. S. Newman,

Inventor
Charles St. John Chubb,
By his Attorneys
Baldwin Davidson & Wight

UNITED STATES PATENT OFFICE.

CHARLES ST. JOHN CHUBB, OF UNITED STATES ARMY.

DUST-PAN.

SPECIFICATION forming part of Letters Patent No. 445,278, dated January 27, 1891.

Application filed May 6, 1889. Serial No. 309,844. (No model.)

*To all whom it may concern:*

Be it known that I, CHARLES ST. JOHN CHUBB, of the United States Army, a citizen of the United States, residing at Fort Bridger, in the county of Uintah and Territory of Wyoming, have invented a new and useful Improvement in Dust-Pans, of which the following is a specification.

The object of my invention is to combine with a dust-pan an apparatus for cleansing the dust-brush used in connection therewith, which end I attain by combining with the dust-pan teeth constituting a comb or rake by which hairs or other matter may be cleaned from the brush.

Figure 1:
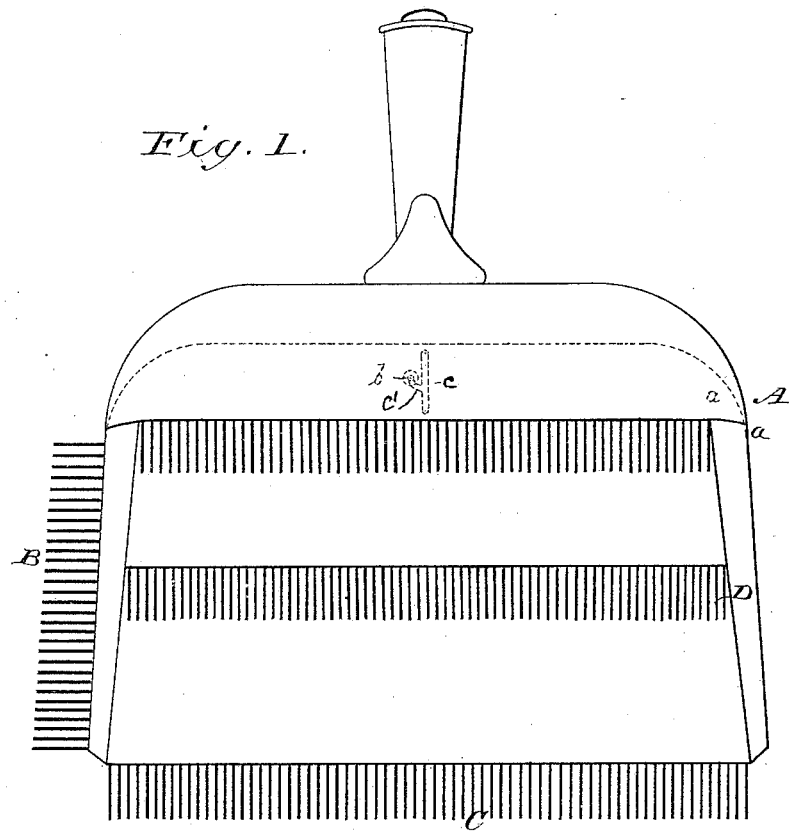
Figure 2:
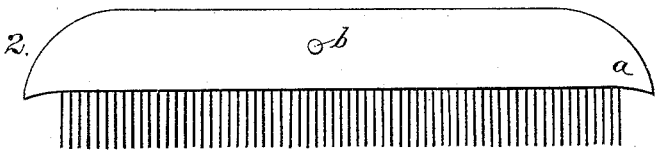
Figure 3:
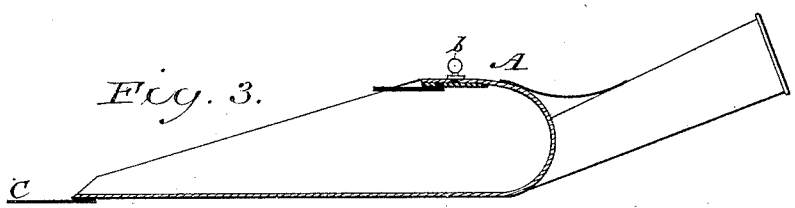

In the accompanying drawings, Figure 1 is a plan view of a dust-pan with my improvements applied thereto. Fig. 2 is a plan view of a modification. Fig. 3 is a longitudinal section through a dust-pan, showing a modification of my invention.

As shown in Fig. 1, a series of teeth constituting a comb or rake $a$ is applied directly to the ordinary cover A of the pan, as well as on one side B, and to the front C thereof.

In Fig. 1 I have also shown teeth as mounted on a separate bar D, extending across the dust-pan from side to side, conforming to the level of the cover. Of course it is not necessary that all these rakes or series of teeth be used at the same time. Any one series of teeth on the pan will in most cases be sufficient, the object being to provide on the outside of the pan a comb or rake by means of which the brush ordinarily used with the pan may be cleared of hairs, loose bristles, lint, &c.

In Figs. 2 and 3 I have shown a further modification of my invention. In this instance a separate rake $a$ is provided with a knob or button $b$. The shank of the knob is adapted to slide back and forth with the rake or comb in a slot $c$, as indicated by dotted lines in Fig. 1. When the comb is not in use, it may be withdrawn under the cover by sliding the knob back to the rear end of the slot $c$, and when in use the knob may be slid forward to the front end of the slot, or it may be diverted into a side slot $c'$, as indicated in Fig. 1.

In the drawings I have shown diagrammatically the formation of the rake or teeth. The teeth may be varied in form and either formed on or secured to the outside of the dust-pan or to a crumb-tray or similar article.

I claim as my own invention—

1. A dust-pan constructed, substantially as hereinbefore set forth, with brush-clearing teeth on its exterior surface.

2. A dust-pan constructed, substantially as hereinbefore set forth, with clearing-teeth on its exterior surface and on one edge thereof.

3. A dust-pan constructed, substantially as hereinbefore set forth, with a cover and a comb or rake adjustably secured to the cover.

4. The combination, substantially as hereinbefore set forth, of the dust-pan, its cover, the comb or rake, and the knob secured thereto and adapted to slide back and forth in a slot in the cover.

In testimony whereof I have hereunto subscribed my name.

CHARLES ST. JOHN CHUBB.

Witnesses:
FRANK HINCHEY,
H. J. TAYLOR.